United States Patent [19]
Young

[11] Patent Number: 6,164,161
[45] Date of Patent: Dec. 26, 2000

[54] BAND SAW BLADE SHARPENER

[76] Inventor: William D. Young, 17505 N. Barnett School Rd., Clark, Mo. 65243

[21] Appl. No.: 09/114,294

[22] Filed: Jul. 13, 1998

[51] Int. Cl.$^7$ .................................................... B23D 63/12
[52] U.S. Cl. .................................. 76/37; 76/112; 83/661
[58] Field of Search ........................... 76/37, 112; 83/661

[56] References Cited

U.S. PATENT DOCUMENTS

| 889,289 | 6/1908 | Wright . | |
|---|---|---|---|
| 2,117,801 | 5/1938 | Heino . | |
| 3,802,299 | 4/1974 | Idel | 76/37 |
| 3,822,613 | 7/1974 | Idel | 76/37 |
| 3,929,040 | 12/1975 | Idel | 76/37 |
| 4,064,770 | 12/1977 | Idel | 76/37 |
| 4,440,045 | 4/1984 | Aksamit | 76/25 A |
| 4,538,654 | 9/1985 | Nickoloff | 144/1 F |
| 5,000,061 | 3/1991 | Shepherd et al. | 76/37 |
| 5,088,358 | 2/1992 | Emter | 76/75 |
| 5,156,071 | 10/1992 | Stevens | 76/37 |
| 5,295,418 | 3/1994 | Emter | 76/37 |
| 5,488,884 | 2/1996 | Andrianoff et al. | 76/41 |
| 5,727,991 | 3/1998 | Main | 451/48 |
| 5,826,465 | 10/1998 | Iseli | 76/112 |

FOREIGN PATENT DOCUMENTS

| 473364 | 3/1992 | European Pat. Off. . |
|---|---|---|
| 2343550 | 10/1977 | France . |
| 89/11937 | 12/1989 | WIPO . |

*Primary Examiner*—Lee Young
*Attorney, Agent, or Firm*—Richard C. Litman

[57] ABSTRACT

A blade sharpener for band saws used in the lumber and other wood processing industries, is installed on the band saw structure for sharpening the band saw blade periodically as required without need to remove the blade from the saw. The sharpener apparatus is retractable within the band saw frame when not in use, permitting the saw to be used normally. When the blade requires sharpening, the apparatus is extended and clamped about the blade. The blade is advanced to the proper position, and the sharpener is actuated to sharpen each of the teeth of the band saw blade in place on the saw. The mechanism includes an automatic shutoff to preclude further sharpening operation once the blade has been advanced through a full cycle and all teeth have been sharpened. The sharpener also includes adjustments for tooth pitch, hook angle, and tooth or gullet depth, enabling the device to be useable for sharpening virtually any band saw blade configuration.

16 Claims, 5 Drawing Sheets

BAND SAW BLADE SHARPENER

BACKGROUND OF THE INVENTION

1. Field of the Invention

The present invention relates generally to tools and equipment, for maintaining and sharpening cutting implements, and more specifically to an automated sharpener for sharpening the blade of a band saw, with the blade remaining in place on the saw during the sharpening operation. The device is mounted on the saw and extended from its normally retracted position for sharpening the blade. Once the initial setup adjustments are made, the device may be automated to sharpen the cutting edge of each tooth of the saw, automatically shutting off when all of the teeth have been sharpened. The device eliminates any need for removal of the blade from the saw for sharpening.

2. Description of the Related Art

Powered saws of various types are used in the timber industry, as well as for various other operations where wood cutting is required (pallet construction and dismantling, etc.). One type of saw which is commonly used in these industries is the band saw, where a flexible toothed metal band is rotated between two wheels or drums, and the cutting is accomplished by the free portion of the band or blade between the two wheels.

Any saw blade, including those of band saws, will become dull over some period of time, depending upon the type of wood being cut. (hard or soft wood, knots, etc.), the type of operation, and other factors. Conventionally, this requires removal of the band from the saw for its transportation to a maintenance shop where the blade may be resharpened. Obviously, this results in increased down time for the saw, as the blade must be removed and a second sharpened blade installed in order to keep the sawing operation going. Oftentimes, the installation of another blade also requires that the blade be aligned and adjusted when it is installed, thus requiring additional down time for the saw. Accordingly, many band saw operators will keep their saw in operation past the optimum efficiency of the blade, with the blade becoming quite dull. This produces an inferior cut and slows the cutting action, but to a point, it is more efficient than removing and replacing the blade for sharpening.

Accordingly, a need will be seen for a means of sharpening a band saw blade with the blade remaining installed on the saw. The present invention provides this function, by means of a retractable sharpening unit which is extended to engage the saw blade when sharpening of the blade is needed. Once the present sharpener has been set up and adjusted for the particular blade on the saw (band width, tooth spacing, etc.), and the sharpening process started, the sharpening process is fully automated until each tooth of the blade has been sharpened. At this point, the device automatically shuts off, and the operator retracts the device for later use.

A discussion of the related art of which the present inventor is aware, and its differences and distinctions from the present invention, is provided below.

U.S. Pat. No. 889,289 issued on Jun. 2, 1908 to Charles Wright, titled "Band Saw Sharpener," describes a manually operated device having at least one ratchet-like wheel thereon. The device is manually placed upon the table of a vertically oriented band saw blade with the teeth of the wheel engaging the teeth of the blade, and the wheel is rotated to advance the blade by one tooth for each cog of the wheel. The cogs of the wheel also produce a scraping action which removes some metal from each tooth as the wheel is turned to advance the blade, thus sharpening the blade. No means of mechanically securing the Wright sharpener to the saw is disclosed, nor is any automation or provision for different tooth rake disclosed. The present invention provides an electrically powered sharpener which provides for each of the above functions.

U.S. Pat. No. 2,117,801 issued on May 17, 1938 to Rudolph Heino, titled "Lumber Saw Sharpener," describes a device for sharpening a radial or circular saw, rather than a band saw. Each of the sharpening stones is pivotally positioned between two plates. The pivotal action is required in order to allow each of the stones to follow the edge of the respective tooth as the blade is rotated. Accordingly, the Heino sharpener cannot be adjusted for different tooth rake or hook angles, as provided by the present invention. Also, no automatic shutoff or tooth pitch adjustment means is provided by Heino.

U.S. Pat. No. 3,802,299 issued on Apr. 9, 1974 to Vladimir V. Idel, titled "Band Saw Sharpening Machine," describes a machine having blade tooth rests at different angles, which impart different forces to the blade to cause it to advance periodically with the action of the grinding wheel. No power means for operating the advance mechanism is disclosed. The Idel patent disclosure refers to mechanisms for feeding the blade both longitudinally and transversely relative to the grinding wheel, thus requiring that the blade be removed from the saw before the Idel sharpener may be used on the blade, unlike the present sharpener which sharpens the blade in place on the saw. Also, the Idel sharpener removes more metal from the blade than does the present sharpener, as Idel uses a force normal to the sharpening wheel as a component of the blade advance mechanism, thereby causing the sharpening wheel to bear against the back of each tooth.

U.S. Pat. No. 3,822,613 issued on Jul. 9, 1974 to Vladimir V. Idel, titled "Bandsaw Grinder," describes a device again requiring the saw blade to be removed from the saw and placed into the grinder. Idel discloses a friction braking mechanism for stopping the blade for each cut, with the present invention providing a similar function but completely different structure for carrying out the braking operation. Idel does not disclose any advance means for the blade, nor any means of adjusting the depth or angle of the cut made by the grinding wheel, which features are provided by the present band saw blade sharpener.

U.S. Pat. No. 3,929,040 issued on Dec. 30, 1975 to Vladimir V. Idel, titled "Band-Saw Sharpening Machine," describes a saw blade positioning fixture for holding and supporting a continuous loop of band saw blade during the sharpening process. The blade must be removed from the saw for installation and sharpening in the Idel fixture, whereas the present sharpener is secured to the saw and sharpens the blade in its installed location in the saw. No specific sharpening, adjusting, blade positioning, or blade advance means is disclosed in the Idel '040 patent, each of which features are provided by the present band saw blade sharpener invention.

U.S. Pat. No. 4,064,770 issued on Dec. 27, 1977 to Vladimir V. Idel, titled "Machine For Sharpening Band Saw Teeth," describes a blade braking device similar to that disclosed in U.S. Pat. No. 3,822,613 to the same inventor and discussed further above. Again, the blade must be removed from the saw for sharpening using any of the Idel sharpening devices. The device of the Idel '770 patent provides a momentary brake release during the cutting or grinding operation on the blade, in order to release the tension on the blade being held in the sharpening fixture. Idel is also concerned about vibration of the blade during the sharpening operation, with no braking force provided on the blade, as he provides spring means to dampen such vibration. The present sharpener sharpens the blade in its installed position on the saw, with the saw providing constant tension on the blade and precluding any requirement for momentary brake devices and the like.

U.S. Pat. No. 5,088,358 issued on Feb. 18, 1992 to James Emter, titled "Automatic Dual-Side Saw Blade Grinder Having Common Blade Advancement And Clamp Actuator And Method Of Using Same," describes a pneumatic advance mechanism for advancing the teeth of a radial or circular saw. The saw blade must be removed from the saw mechanism for sharpening, unlike the present sharpener which is installed on the saw. The present mechanism utilizes a single electric motor to provide blade band advance and also to cycle the grinding or cutting wheel to sharpen each individual tooth of the saw blade, unlike the Emter mechanism.

French Patent Publication No. 2,343,550 published on Oct. 7, 1977 illustrates a device for sharpening a band saw blade, with the device having separate motors for blade advance and operating the sharpening wheel. No means is apparent for attaching the device to an existing band saw, as provided by the present device.

International Patent Publication No. 89/11,937 published on Dec. 14, 1989, titled "Apparatus And Process For The Grinding Of A Profile Of A Band Saw," describes a band saw blade sharpener using a sanding belt with a small radius pressure roller to work the belt into each tooth of the band. The sanding belt mechanism is unlike the grinding wheel sharpener of the present invention. Also, while the publication uses the term "band saw" throughout, the term refers only to the blade of the saw, not the entire saw mechanism. The blade must be removed from the saw for sharpening using the sharpener of this international publication, unlike the present invention which sharpens the blade in place on the saw.

European Patent Publication No. 473,364 published on Feb. 15, 1995, titled "An Apparatus For Sharpening Saw Blades," describes an apparatus for sharpening various types of saw blades, with a mechanical linkage serving to oscillate the grinding motor and wheel as a crank is manually turned to cycle the mechanism. As in each of the other devices discussed above, the blade must be removed from the saw in order to be sharpened using the device disclosed in the European publication. Moreover, the manual mechanism for advancing the blade and moving the cutting wheel are unlike the fully automated mechanism of the present invention.

Finally, the Brewco Company manufactures a combination band saw blade sharpener and tooth setter, using an electric motor for positioning the sharpening wheel and advancing the blade. However, the Brewco device cannot be attached to an existing band saw. Rather, the Brewco sharpener is a separate device, having its own stand, and requiring the band saw blade to be removed from the saw for sharpening using the Brewco device, as in the case of each of the other sharpening devices discussed further above and known to the present inventor. Also, the Brewco device does not provide any means of automatically stopping the blade advance when all of the teeth have been sharpened, which automatic stopping means is provided by the present band saw blade sharpener invention.

None of the above inventions and patents, taken either singly or in combination, is seen to describe the instant invention as claimed.

SUMMARY OF THE INVENTION

The present invention comprises a band saw blade sharpener which is installable on the band saw frame or structure and which may be left in place on the saw at all times. The device is retractable to a stored position when the saw is in use, but may be extended for sharpening the blade in place on the saw as desired. The present sharpener utilizes two motors, with the first driving a circular grinding or cutting wheel for sharpening the teeth of the blade, and the second driving a blade advance and grinding motor oscillating mechanism. The device is fully automated once the appropriate adjustments have been made for the specific tooth pitch and other factors of the blade, with the device providing for automatic shutoff when all teeth of the blade have been sharpened.

Accordingly, it is a principal object of the invention to provide an improved band saw blade sharpener for installing on a band saw, for sharpening the blade of the band saw in place on the band saw.

It is another object of the invention to provide an improved band saw blade sharpener which is fully automated in its operation once the initial settings have been made for the specific blade installed on the band saw.

It is a further object of the invention to provide an improved band saw blade sharpener including automatic shutoff means for stopping the sharpening operation when one complete cycle of the blade has been completed.

An additional object of the invention is to provide an improved band saw blade sharpener which is fully adjustable for tooth pitch, hook angle, and tooth or gullet depth to provide accurate sharpening for a variety of blade configurations.

Still another object of the invention is to provide an improved band saw blade sharpener which utilizes the operational power of the band saw as a power source for sharpening operations.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises an automated sharpening device for sharpening the blade of a band saw, with the blade remaining installed on the band saw during the sharpening operation. The present band saw blade sharpener is temporarily or (preferably) permanently installed on the band saw structure, thereby being ready for use in sharpening the blade as needed with very little setup time or down time for the saw being required.

Figure 1:
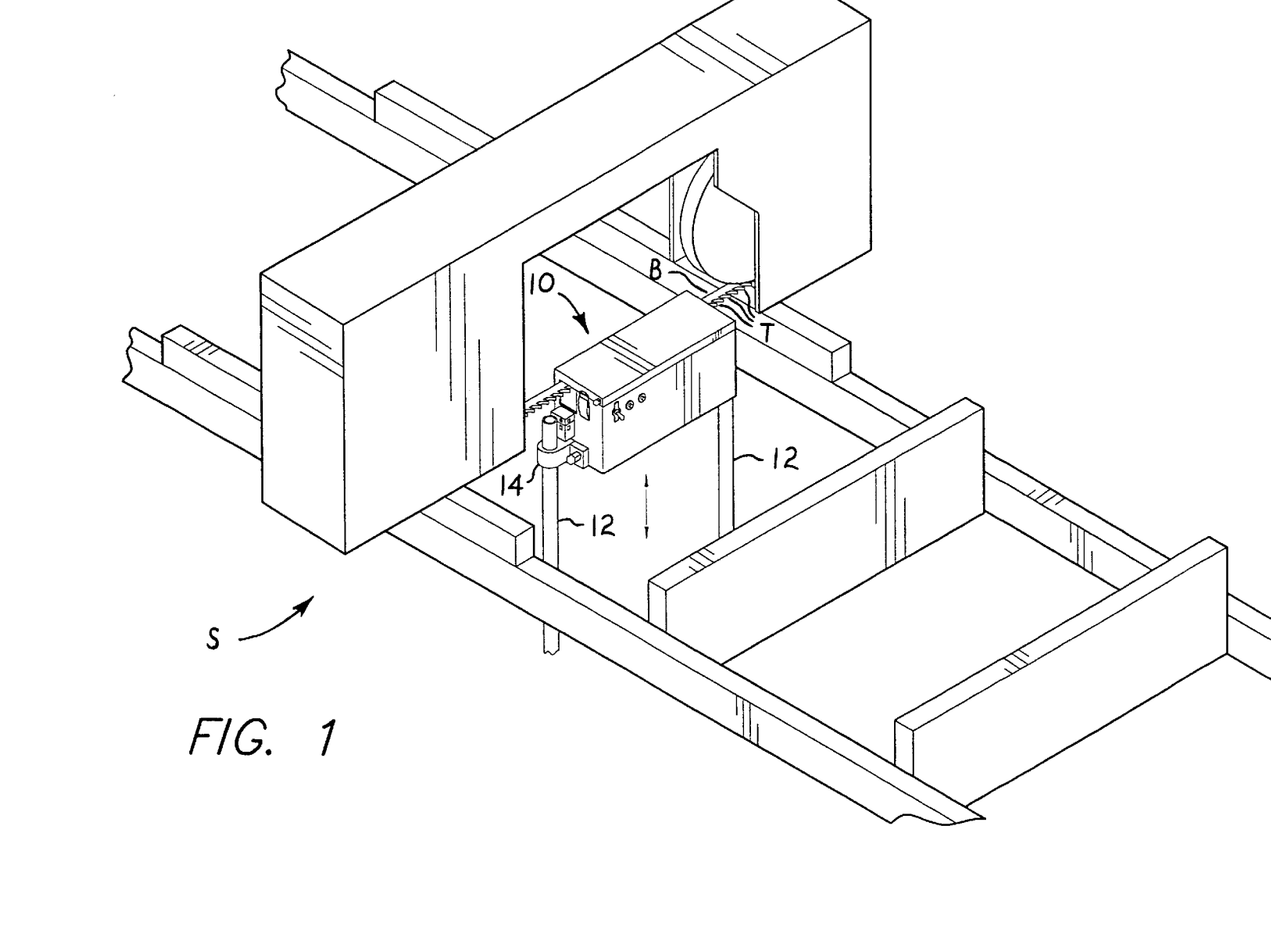
FIG. 1 is a perspective view of the present band saw blade sharpener installed on a lumber band saw, with the sharpener shown in the raised or extended position for blade sharpening operation.

FIG. 1 provides a partial perspective view of a band saw S with the present sharpener, generally indicated by the reference numeral 10, installed thereon. The saw S includes a continuous blade B having a cutting edge comprising a continuous plurality of teeth T, with the exposed portion of the blade B defining a cutting plane P (shown more clearly in FIG. 4) for the saw S. The sharpener 10 generally comprises a case or frame which is retractably supported upon a pair of opposed supports 12, which are in turn conventionally secured to the structure of the saw S. Each end of the sharpener frame includes a bracket 14 (one of which is shown in FIGS. 1 and 2, with the support structure being understood to be laterally symmetrical) which is slidably mounted to its respective support 12.

Figure 2:
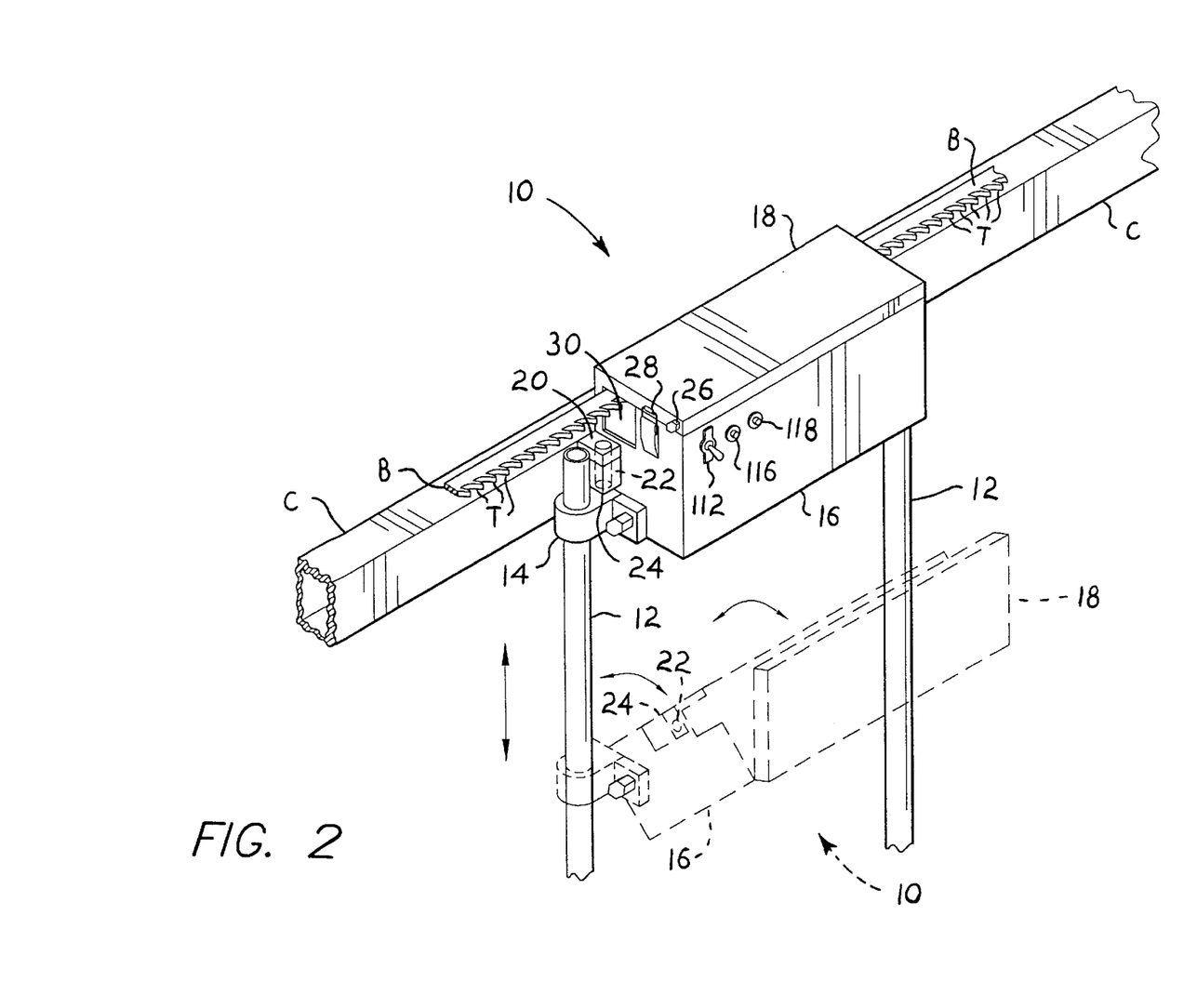
FIG. 2 is a detailed exterior perspective view of the sharpener apparatus of FIG. 1, showing the extension and retraction operation as well as the means for securing the apparatus about the saw blade.

FIG. 2 provides a more detailed illustration of this retractable support means for the sharpener 10. The two stanchions or supports 12 each define an axis normal to the cutting plane, i.e., vertical axes for a saw S having a horizontally disposed cutting plane for the blade B, as shown in the present embodiment. (It will be understood that the present sharpener 10 is also adaptable to saws having other configurations than the one depicted herein.) The sharpener 10 is normally retracted to a stored position, shown generally in broken lines in FIG. 2, below the cutting plane P of the blade B, when the saw S is in cutting operation. However, when the blade B must be sharpened, the sharpener frame is raised on the supports 12 to extend into the cutting plane and lock about the blade B for sharpening the blade.

The case or frame of the sharpener 10 essentially comprises a lower mechanism 16 with a selectively openable upper lid or top 18 hinged thereto. (The lower mechanism 16 may also be hinged or pivotally secured to the brackets 14 at each side or end thereof for easier access to the operating components, if desired, as shown in broken lines in FIG. 2.) When the saw blade B requires sharpening, the saw is stopped for a short time and the sharpener frame 10, comprising the lower mechanism case 16 and upper lid 18, is raised or extended on the two stanchions or supports 12 from its retracted or stored position, shown in broken lines in FIG. 2, to its extended sharpening position shown in solid lines in FIG. 2.

A locating fixture 20 having a pin 22 extending therefrom is immovably affixed to some convenient structure of the saw S, such. as the crossmember C of FIG. 2, with a mating locator receptacle 24 being affixed to the lower frame or case 16 of the sharpener 10. (Preferably, two such assemblies are provided at opposite sides of the sharpener 10.) When the sharpener 10 is raised, the pin 22 (shown in broken lines in FIG. 2) engages the mating hole in the receptacle 24 to lock the sharpener 10 precisely relative to the structure of the saw.

The lid 18 is hinged or pivotally secured to the lower case 16 by bolts or pins 26 at opposite sides or ends of the sharpener 10. The saw blade B is captured or sandwiched between the lower mechanism or case 16 and the upper lid 18, by closing the hinged lid 18 over the mechanism 16 and securing it with latches 28. (A blade clearance passage 30 is located on each side of the case 16.)

Figure 3:
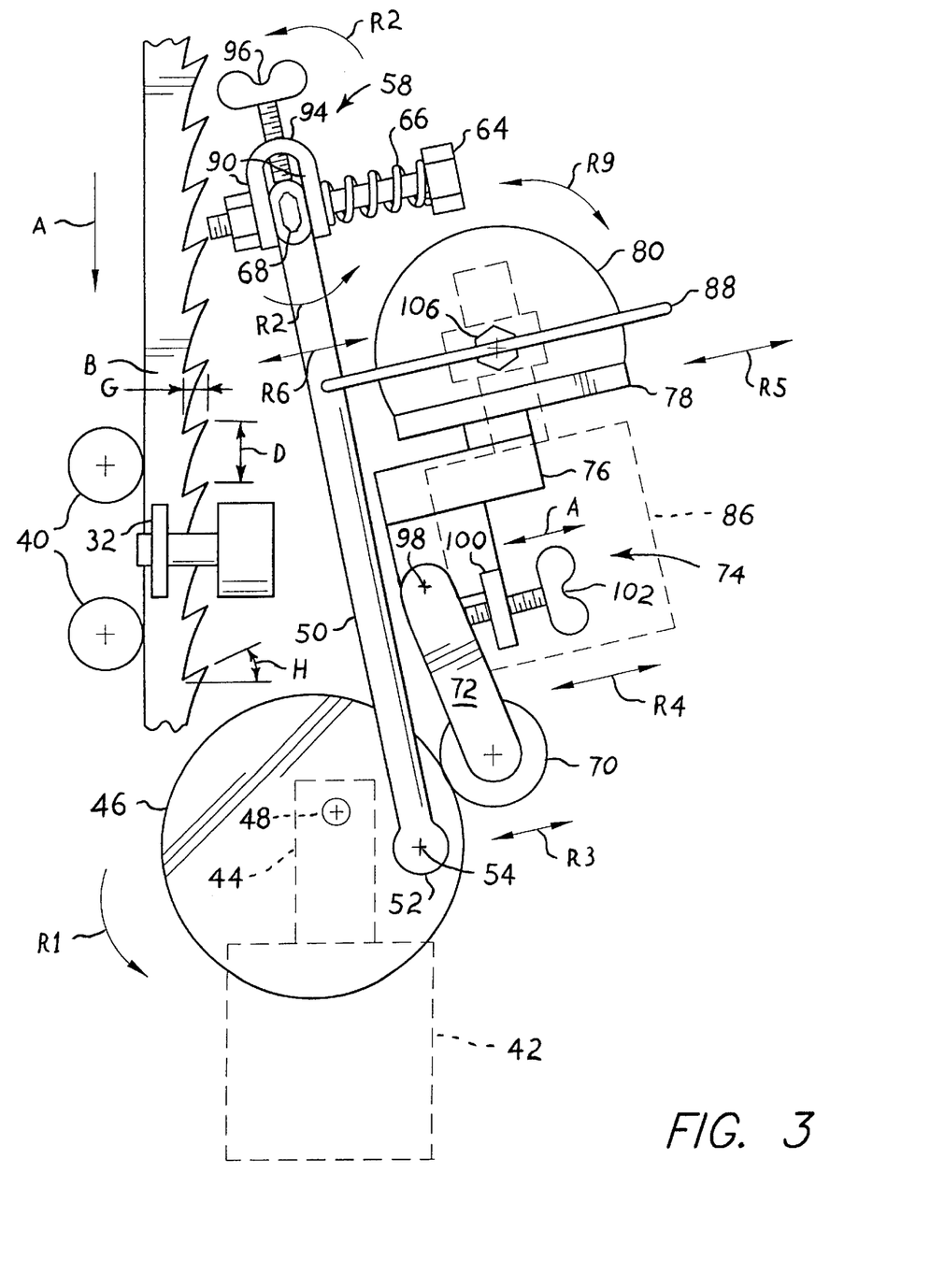
FIG. 3 is a top plan view of the mechanism of the present band saw blade sharpener, illustrating operational details thereof.
Figure 4:
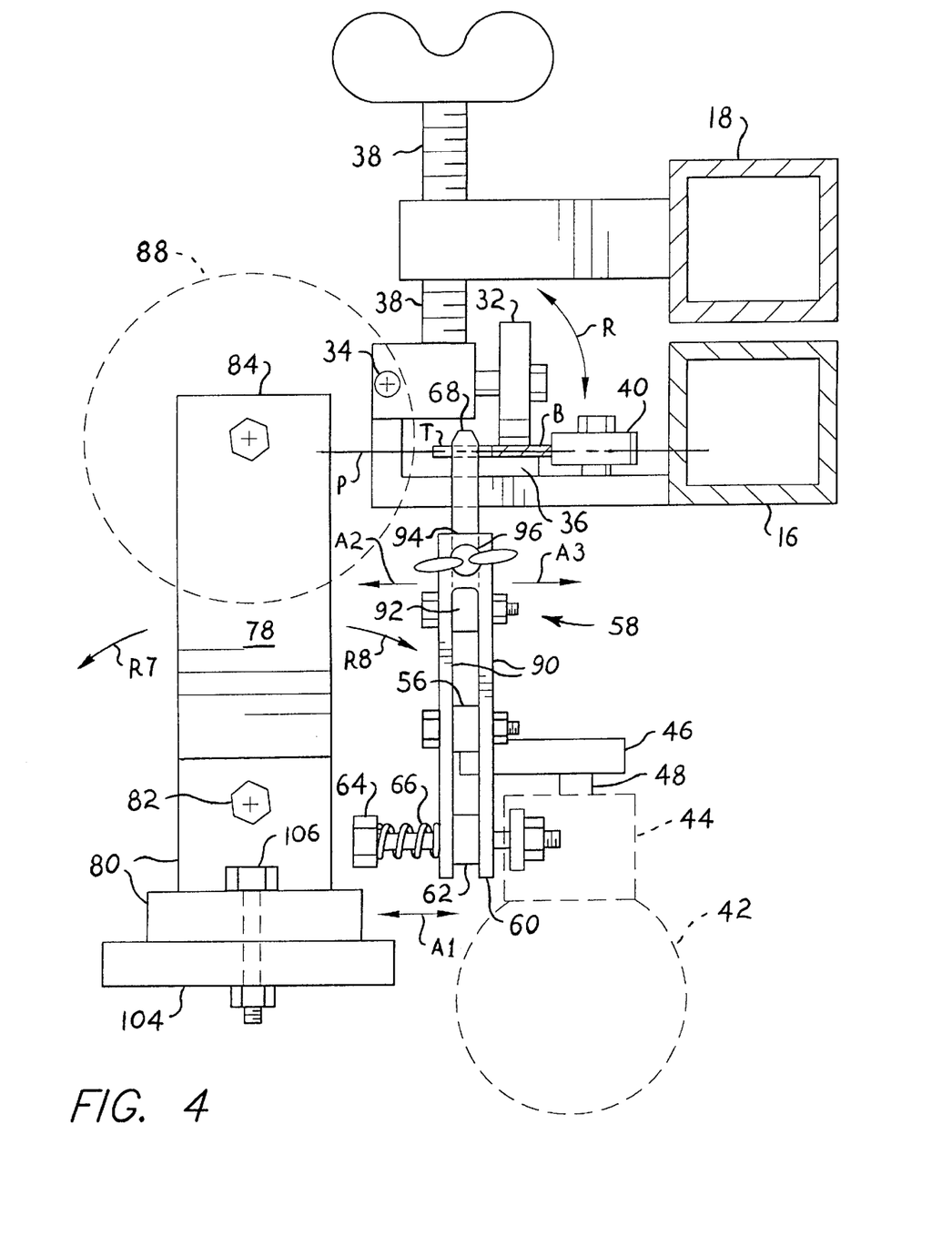
FIG. 4 is an end elevation view of the mechanism of FIG. 3, illustrating further operational details.

FIGS. 3 and 4 respectively provide detailed top plan and end elevation views of the present sharpener mechanism, showing the mechanism in a raised position for sharpening the band saw blade B which has been captured within the sharpener. It will be seen that some means of precisely locating or positioning the blade B within the mechanism is required, in order to provide accurate sharpening of each of the teeth T of the blade B. Accordingly, an upper pinch roller 32 is secured to the lower mechanism structure by a pivot 34 (shown in FIG. 4), which may travel through an arc shown by the arrow R. When the lid 18 is closed and latched, the pinch roller 32 is pressed downwardly against the blade B, with the lower side of the blade B bearing against a fixed anvil plate 36. Pressure adjustment for the pinch roller 32 against the blade B, may be provided by a threaded adjustment 38, or other suitable means. The drag of the blade B against the fixed anvil 36 as the blade B is periodically advanced through the mechanism for sharpening each of the teeth T, serves as a brake to hold the blade B immovably for the individual sharpening of each tooth, precluding inadvertent or undesired longitudinal movement of blade B through the mechanism.

Lateral alignment for the blade B is provided by one or more edge rollers 40, which bear against the straight rearward edge E of the blade B, opposite the toothed cutting edge. (Preferably two such edge rollers 40 are provided, for stability.) This combination of rollers and fixed anvil serves to secure the blade B precisely within the mechanism, with no vertical or lateral movement away from the grinding or cutting wheel being permitted.

In a saw blade sharpener, it is essential to provide some means of advancing the blade by one tooth position for each sharpening stroke, to assure that all teeth are sharpened. The plan view of FIG. 3 provides a view of the blade advancing means used in the present sharpener. The present sharpener uses a single (preferably electric) drive motor 42 to drive the mechanism for both advancing the blade B, and also for cycling the grinding wheel toward and away from the blade to sharpen each tooth of the blade. (The drive motor 42 is a conventional motor using a conventional right angle gear reduction drive 44, with the motor 42 and drive 44 being shown in broken lines for clarity in the drawing figure.)

The drive motor 42 drives a combination cam and eccentric wheel 46 by means of its reduction drive 44, with the cam and eccentric 46 rotating about an offset axis 48. A blade advance arm 50 has a first end 52 pivotally secured to the cam and eccentric 46 at an eccentric point 54 radially displaced from the rotational axis 48 of the cam and eccentric 46. The opposite second end 56 of the arm 50 is pivotally secured to a blade advance finger assembly 58, with the attachment more clearly shown in FIG. 4. The lower end 60 of the finger assembly 56 is pivotally secured to the structure 62 of the lower mechanism 18 by a bolt 64, with the bolt 64 having an excess length with slack taken up by a compression spring 66. Thus, the lower end 60 of the advance finger assembly 56 may move or slide laterally along the length of the bolt 64, with the spring 66 urging it in the direction of the saw blade B.

When the wheel 46 is rotated in a counterclockwise direction, as viewed from above in FIG. 3 and indicated by the rotational arrow R1, the first or eccentric attachment end 52 of the blade advance arm 50 describes a circle defined by the radius of the arm attachment point 54 from the rotational axis 48 of the cam and eccentric 46. This causes the opposite blade advance finger attachment end 56 of the arm 50 to tend to travel a similar path, thus causing the blade advance assembly 58 to oscillate back and forth in a plane generally parallel to the movement of the blade B through the sharpener 10. However, the lateral freedom permitted by the length of the attachment bolt 64 through the lower end 60 of the advance assembly permits the finger mechanism attachment end 56 of the arm 50 to describe a somewhat circular pattern, similar to the pattern described by the first end 52 of the arm 50, thus causing the free upper end of the assembly 58 and the attached blade advance finger 68 to describe a similar pattern, indicated by the second rotational arrows R2, while moving toward and away from the blade B along the bolt 64, as shown by arrows A1 through A3.

It will be seen that this counterclockwise pattern of movement of the blade advance finger 68 will cause the finger 68 to periodically engage one of the teeth T of the blade B, and to push the blade B toward the rollers 32 and 40. When a predetermined advance of the blade B has been accomplished, the rotational movement of the finger 68 will cause it to disengage from the blade B, whereupon it will rotate back to pick up the next blade tooth T, etc., continuing to advance the blade B one tooth at a time.

The above described blade advance mechanism serves to position each tooth T of the blade B in position for sharpening. However, the drive motor 42 also serves to oscillate or reciprocate the sharpening motor and wheel, as described below. The outer circumference of the cam and eccentric 46 serves as a cam to drive a cam follower 70 at the first or driven end 72 of a sharpening motor cam arm assembly 74, which oscillates generally toward and away from the saw blade S in the directions of the reciprocation arrows R3 through R6 as the cam 46 rotates. The opposite end 76 of the cam arm assembly 74 is secured to a sharpening motor support arm 78, which is pivotally secured to other structure 80 by a bolt or pin 82. Thus, as the cam and eccentric 46 rotates, the cam follower 70 is oscillated or reciprocated alternately toward and away from the saw blade B, driving the cam arm assembly 74 in like manner to alternately push and pull the sharpening motor support. arm 76 toward and away from the saw blade B.

The opposite distal end 84 of the sharpening motor support arm 76 includes a sharpening motor 86 (shown in broken lines in FIG. 3, for clarity in the drawings) secured thereto, with the motor 86 having a grinding or sharpening wheel 88 secured to the drive shaft thereof. The sharpening wheel 88 rotates to define a plane (shown by the edge of the wheel 88 illustrated in the top plan view of FIG. 3) which is selectively aligned with each of the teeth T of the blade B, or more specifically, with the cutting face or hook of each of the teeth T, for sharpening the cutting face or hook of each tooth.

It will be seen that when power is applied to the drive motor 42 and sharpening motor 86 of the present sharpener 10, that the rotation of the combination cam and eccentric wheel 46 by the drive motor 42 will rotate and reciprocate the blade advance arm 50, thereby reciprocating the blade advance assembly 58 and blade advance finger 68 to advance the blade B one tooth at a time in the direction of the blade advance arrow A of FIG. 3. (It will be noted that the term "blade advance" in the present disclosure means the movement of the blade B in a direction opposite the cutting direction of the blade, in order to take advantage of the ratchet-like configuration of the blade teeth T for moving the blade B during the sharpening operation.)

Simultaneously, the cam follower 70, riding on the periphery of the cam and eccentric 46, causes the sharpening motor cam arm assembly 74 and attached sharpening motor support arm 78 to rock or reciprocate generally toward and away from the blade B as the arm 78 pivots about the mounting bolt 82, as indicated by the reciprocation motion arrows R7 and R8 of FIG. 4. The positioning of the first or eccentric attachment end 52 of the blade advance. arm 50, and the orientation of the eccentric offset of the cam and. eccentric 46, are such that as the blade advance mechanism releases the blade B, with the blade B being held stationary by the braking means described further above, the sharpening disc or wheel 88 is rocked into position to engage the hook or face of the tooth T aligned therewith, thereby sharpening that tooth T. Continued rotation of the cam and eccentric 46 then rocks the sharpening motor 86 and wheel 88 away from the blade B, simultaneously with the engagement of the blade advance finger 68 with one of the teeth T of the blade B by means of the action of the blade advance arm 50, thereby advancing the blade B by one tooth T for the next tooth sharpening cycle. The above described process continues so long as power is applied to both drive motor 42 and sharpening motor 86.

Band saw blades are provided with different tooth pitches or interval distances D, gullet depths G (height of the teeth above the bottom or valley of each tooth), and hook (tooth face) angles H, which parameters are indicated for the blade B of FIG. 3. For example, different hook angles are used for cutting hardwoods and softwoods, with a hook angle of about eight to ten degrees desired for hardwoods and about fifteen degrees for softwoods, as measured from a reference perpendicular to the blade. Thus, depending upon the particular wood to be cut, a saw operator may change blades on the saw in order to provide a blade having optimum characteristics for the specific type of cutting to be performed. Accordingly, the present sharpener 10 provides adjustment means for each of the above parameters.

Adjustment for tooth pitch distance D of the blade B is accomplished by means of the blade advance assembly 58. The assembly 58 basically comprises a pair of spaced apart lower arms 90 (shown more clearly in FIG. 4), with the second end 56 of the blade advance arm 50 pivotally captured therebetween. By changing the position of the second end 56 of the blade advance arm 50 upwardly or downwardly between the two arms 90, i.e., away from or toward the pivot bolt 64, the total throw of the blade advance finger 68 may be adjusted. Moving the second end 56 of the advance arm 50 toward the pivot bolt 64 results in a longer throw for the blade advance finger 68, due to the second end 56 of the arm 50 still traveling the same distance due to the rotation of the cam and eccentric 46, but the shorter distance between such a closer attachment point for the second end 56 of the arm 50 and the pivot bolt 64, results in a longer throw for the distal end of the blade advance mechanism 58. Conversely, placing the second end 56 of the advance arm 50 farther from the pivot bolt 64, shortens the blade advance throw for blades B having a smaller tooth pitch distance D.

Fine adjustments are accomplished by adjusting the angle of the blade advance finger 68 relative to the lower arms 90 of the blade advance mechanism 58. The upper portions of the two lower arms 90 serve to capture the lower end 92 of the blade advance finger 68 pivotally therebetween. The two arm components 90 are bridged together at their upper ends 94, with an advance finger adjustment screw 96 being threaded through the bridged connection area 94, as shown most clearly in FIG. 3. The distal end of the adjustment screw 96 adjustably bears against the blade advance finger 68 above its lower end 92. Thus, turning the advance finger adjustment screw 96 inwardly toward the advance finger 68, results in movement of the advance finger 68 in the direction of blade advance, indicated by the advance arrow A of FIG. 3, while turning the screw 96 in the opposite direction allows the advance finger 68 to move in the direction opposite the blade advance.

Adjustment for the blade gullet depth G is accomplished by means of the sharpening motor cam arm assembly 74, and is shown in FIG. 3 of the drawings. This also adjusts for wear on the grinding or sharpening wheel or disc 88, as its diameter is reduced by use. The cam arm assembly 74 actually comprises two basic components. The first end 72 of the assembly 74 is pivotally attached to the second end 76 at a pivot point 98 (e.g., a bolt, pin, etc.). The second end or component 76 of the cam arm assembler 74 includes an adjusting lug 100 extending therefrom, disposed to one side of the cam follower portion or end 72. The adjusting lug 100 has an adjusting screw 102 threaded therethrough, with the distal end of the screw 102 bearing against the side or edge of the first or cam follower end 72 of the assembly 74.

If the cutting wheel 88 has been worn sufficiently, and/or the gullet depth G of the blade being used is relatively deep, then the depth of the sharpening cut may be increased by turning the adjustment screw 102 inwardly. (Adjustment motion of the screw 102 is shown by the arrow A4.) This causes the second end 76 of the sharpening motor cam arm assembly 74 to rotate or pivot counterclockwise relative to the opposite first end 72 of the assembly 74, thus pushing the sharpening motor support arm 78 further toward the blade B and driving the sharpening disc 88 deeper into the blade tooth gullet for each sharpening pass. The sharpening cuts may be made more shallow by turning the adjustment screw 102 outwardly, to reverse the relative angular displacement described above for the two components 72 and 76.

As noted further above, blades B having different hook angles H may be used, depending upon the type of wood being cut, etc. Accordingly, the present sharpener 10 provides adjustment for different blade hook angles H. The base attachment structure 80 for the sharpening motor support arm 78 is pivotally secured to a fixed structure 104 of the lower mechanism 16 of the sharpener 10, by a bolt or pin 106 or the like. The bolt or pin 106 is normal to the plane P of the blade B, and permits the base structure for the sharpening motor support arm 78 to be pivoted or rotated about the axis defined by the bolt or pin 106, as indicated by the rotational arrow R9, thus changing the angle of the support arm 78, sharpening motor 86, and sharpening wheel 88 relative to the blade B to adjust for different hook angles H as desired. Rotation of the motor support arm assembly in a clockwise direction, as viewed in FIG. 3, provides for sharpening blades with shallower hook angles H, while turning the assembly in a counterclockwise direction provides for blades with greater hook angles.

Figure 5:
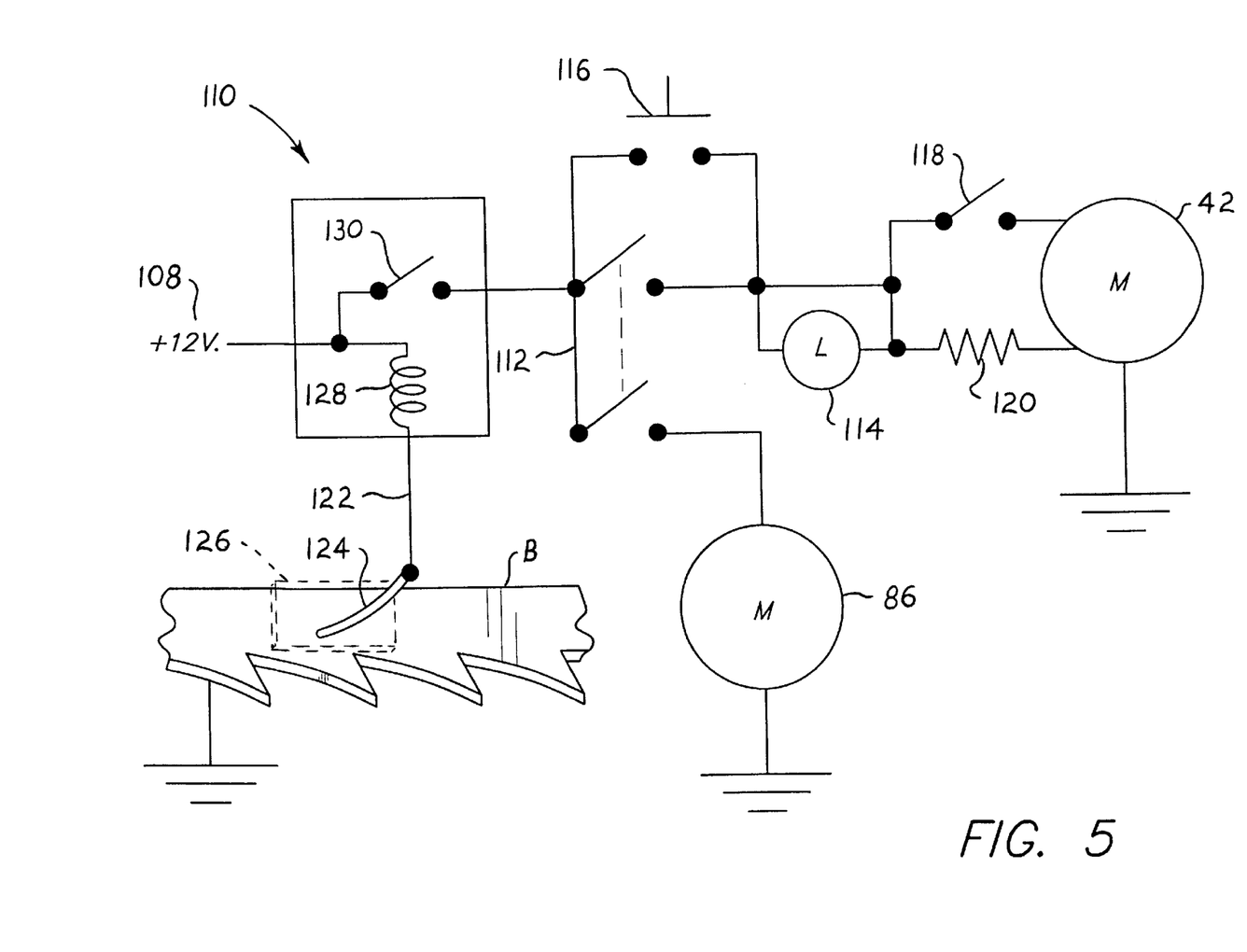
FIG. 5 is an electrical schematic diagram of the present sharpener.

FIG. 5 illustrates an general electrical schematic for the present band saw blade sharpener 10, and will be described along with the operation of the present sharpener 10. Saws such as the band saw S are typically electrically powered, and the present sharpener 10 may utilize power from the same source (12 volt battery, generator, etc.) used to power the band saw S. Power is applied from an electrical power source 108 to the operating circuit of the sharpener, and may pass through a relay 110 which provides an automatic shutoff function, discussed further below.

Assuming that the relay 110 is closed to provide continuity, electrical power passes to a double pole switch 112, providing electrical power for both the drive motor 42 and sharpening motor 86 when closed. (A single pole switch and appropriate wiring could be used in lieu of the double pole switch 112.) When the switch 112 is closed, both the drive motor 42 and sharpening motor 86 are actuated to operate the sharpener as described further above. (A safety switch, not shown, may be installed in the interface between the lid 18 and lower case mechanism 16, permitting power to be supplied to the circuit only when the sharpener 10 is secured about the blade B.) One or more lights 114 may also be provided in parallel with the motors 42 and 86, if so desired, and installed in a position within the lower mechanism case 16 so as to illuminate the operation of the sharpener 10, particularly the various adjustments therefor, during the operation of the sharpener.

It will be noted that the teeth T of the blade B will be randomly positioned along the path of the blade B when the blade is stopped for sharpening, even though the positioning means for the sharpener 10, provided by the mating locator pin 22 and receptacle 24 for precise positioning of the sharpener 10 in its extended or sharpening position, serve to position the sharpener 10 precisely. Accordingly, some means is required to align the blade B precisely relative to the sharpener 10 before the actual automated sharpening operation begins, so the sharpening wheel or disc 88 just contacts the leading edge or hook portion H of each tooth T during the sharpening operation, rather than contacting the back of the tooth.

The present sharpener 10 invention provides for such blade alignment by means of a normally open, momentary contact switch 116 in the electrical circuit of the sharpener 10. This switch 116 is wired only to the drive motor 42, and does not provide power to the sharpener motor 86. Thus, with the main power switch 112 remaining open, the momentary contact blade positioning switch 116 may be activated to operate only the blade advance and sharpener motor support arm movement linkages, with the sharpener motor 86 remaining inactive. The operator of the sharpener 10 may momentarily close the switch 116 to operate the linkages, causing the blade advance finger 68 to move incrementally to advance the blade B in like manner until one of the teeth T of the blade B is precisely positioned with the hook portion precisely aligned with the sharpening or grinding surface of the sharpening wheel 88.

At this point, the operator may close the main power switch 112 to activate the sharpener 10. A high/low speed switch 118 may be closed to bypass a lower speed resistance circuit 120 for the drive motor 42, thereby speeding up the cycling operation of the drive motor 42 and the blade advance and sharpener motor linkages driven thereby, if so desired.

The relay 110 provides a means of automatically shutting off the sharpener 10 after one complete revolution of the blade B has been made and each tooth T of the blade has been sharpened. The ground line 122 of the relay 110 may include a switch 124 in series therewith, with the switch 124 comprising a contact bearing against the blade B and serving to ground the circuit through the blade B.

By placing a small piece of electrically insulating material 126 on the blade B (electrical tape, etc.), the electrical continuity of the ground contact switch 124 is interrupted when the blade B is advanced to a position where the insulation 126 is located between the contact 124 and the blade B. (The blade B is normally electrically grounded to the remainder of the saw circuit; other grounding means may be provided between the blade B and the saw S structure to provide a good electrical grounding path for the relay ground 122 as required.) The operator of the sharpener 10 may position the blade B using the momentary contact switch 116, then place a small piece of electrical tape or other suitable electrically insulating material 126 immediately beyond the ground contact switch 124 in the direction of travel of the blade B during the sharpening operation, with the ground contact switch 124 making contact with the blade B just forward of the insulation 126.

The operator then turns on the main switch 112 to activate the sharpener 10, with the sharpener 10 cycling the blade advance and sharpener motor reciprocation mechanisms described further above to sharpen each of the teeth T of the blade B. As the last tooth is sharpened, the blade advance mechanism will advance the blade B by one more tooth, thus positioning the insulation 126 between the ground contact switch 124 and the grounded blade B to interrupt the ground circuit of the sharpener 10. As electrical current is interrupted through the coil 128 of the relay 110, the relay switch 130 opens, thus interrupting power to the motors 42 and 86 and automatically stopping the operation of the sharpener 10.

In summary, the present band saw blade sharpener provides a much needed means of automatically sharpening band saw blades in place on the saw, without need to remove the blade from the saw for sharpening. The savings of time in not being required to remove and replace the blade for each sharpening operation, will pay for the present sharpener in short order. Also, saw operators will tend to sharpen the blades of their saws more frequently by means of the present invention, due to the savings of time in not being required to remove and replace the blade each time for sharpening. This will lead to higher quality cuts and improved performance for the saw, thus further increasing the efficiency of the operation.

Another efficiency provided by the present sharpener is that as the blade remains in place on the saw, no additional time is required for aligning and tensioning the blade after sharpening. The present sharpener operates with the blade in its normal position, and thus the saw does not require any further time consuming alignment and tensioning of the blade after sharpening, as is required when the blade is removed from the saw for sharpening. The operator need only position the saw head over the present sharpener, raise or extend the sharpener and adjust the guide and pinch rollers about the blade, and close the lid of the sharpener over the blade. Once the blade has been precisely positioned for the start of the operation, the operator need only activate the main power switch while the sharpener goes through one complete cycle and shuts off automatically at the end of the sharpening cycle for the blade. The operator may then open the lid and retract the sharpener to its normally retracted and stowed position beneath the cutting plane of the blade, and close the lid of the sharpener for storage until needed again. Accordingly, the present sharpener will prove to be a most desirable accessory for virtually all manufacturers and operators of band saws of virtually every type.

It is to be understood that the present invention is not limited to the sole embodiment described above, but encompasses any and all embodiments within the scope of the following claims.

What is claimed:

1. A sharpener for a band saw blade of a band saw, with a blade having a cutting edge with a plurality of teeth thereon, said sharpener comprising:
   a sharpener frame securable to the band saw, for sharpening the blade of the band saw with the blade remaining in operational position on the band saw, said sharpener frame including:
   means for securing about the blade, said securing means comprising a lower mechanism having a selectively openable and latchable upper lid hinged thereto, with said lower mechanism and said lid for sandwiching the blade therebetween with said lid being latched to said lower mechanism,
   means for holding the blade in proper alignment relative to said sharpener frame,
   means for advancing the blade, and
   means for consecutively sharpening each of the teeth of the blade, including a pivotally mounted sharpening motor arm having a distal end with a sharpening motor affixed thereto, said sharpening motor having a sharpening wheel extending therefrom with said sharpening wheel defining a plane for selective alignment with each of the teeth of the blade, a sharpening motor cam arm affixed to said sharpening motor arm, a combination cam and eccentric with said cam arm communicating with said combination cam and eccentric, and a drive motor driving said combination cam and eccentric, with said sharpening motor arm periodically positioning said sharpening wheel into a position for sharpening engagement with each one of the teeth of the blade.

2. The band saw blade sharpener according to claim 1 wherein said sharpener frame is selectively retractable to a stored position and selectively extendible for securing about the blade for sharpening the blade.

3. The band saw blade sharpener according to claim 1 wherein said means for holding the blade in proper alignment relative to said sharpener frame comprises a pivotally mounted upper roller, a stationary lower anvil, and at least one edge roller each disposed within said frame, with said upper roller and said lower anvil for sandwiching the blade therebetween and with said at least one edge roller for bearing against the rearward edge of the blade, and with said stationary lower anvil serving as a brake means for the blade for precluding inadvertent advance of the blade.

4. The band saw blade sharpener according to claim 1 wherein said means for consecutively sharpening each of the teeth of the blade includes means for adjusting for tooth pitch, gullet depth, and hook angle of the teeth of the blade.

5. The band saw blade sharpener according to claim 1, including means for automatically shutting off said blade advancing means and said sharpening means when all of the teeth of the blade have been sharpened.

6. The band saw blade sharpener according to claim 1, wherein said sharpener frame includes a sharpener motor disposed therein with a sharpening wheel thereon, and a single drive motor disposed therein for advancing the blade and for periodically positioning said sharpening wheel into a position for sharpening engagement with each one of the teeth of the blade.

7. The band saw blade sharpener according to claim 6, wherein said sharpener motor and said single drive motor each comprise an electric motor.

8. A sharpener for a band saw blade of a band saw, with the blade having a cutting edge with a plurality of teeth thereon, said sharpener comprising:
   a sharpener frame securable to the band saw, for sharpening the blade of the band saw with the blade remaining in operational position on the band saw, said sharpener frame including:
   means for securing about the blade,
   means for holding the blade in proper alignment relative to said sharpener frame, means for advancing the blade, said advancing means comprising a drive motor, a combination cam and eccentric driven by said drive motor, a blade advance arm eccentrically secured to and extending from said cam and eccentric, and a blade advance finger pivotally secured to said sharpener frame and to said blade advance arm, with said blade advance arm periodically reciprocating said blade advance finger for consecutively engaging each one of the teeth of the blade for advancing the blade, and means for consecutively sharpening each of the teeth of the blade.

9. A band saw with a continuous blade having a cutting edge with a plurality of teeth thereon and a straight rearward edge opposite said cutting edge, and a sharpener for said band saw blade, comprising in combination:

a sharpener frame secured to said band saw, for sharpening said blade with said blade remaining in operational position on said band saw, said sharpener frame including:

means for securing about said blade, means for holding said blade in proper alignment relative to said sharpener frame, said holding means comprising a pivotally mounted upper roller, a stationary lower anvil, and at least one edge roller each disposed within said frame, with said blade being sandwiched between said upper roller and said lower anvil and with said at least one edge roller bearing against said rearward edge of said blade, and with said stationary lower anvil serving as a brake means for said blade for precluding inadvertent advance of said blade, means for advancing said blade, including a drive motor, a combination cam and eccentric driven by said drive motor, a blade advance arm eccentrically secured to and extending from said cam and eccentric, and a blade advance finger pivotally secured to said sharpener frame and to said blade advance arm, with said blade advance arm periodically reciprocating said blade advance finger for consecutively engaging each one of said teeth of said blade for advancing said blade, and means for consecutively sharpening each of said teeth of said blade.

10. The band saw and blade sharpener combination according to claim 9 with said band saw blade defining a cutting plane, wherein said sharpener frame is selectively retractable to a stored position below said cutting plane for operation of said band saw, and selectively extendible for securing about said blade for sharpening said blade.

11. The band saw and blade sharpener combination according to claim 9, wherein said means for securing said sharpener frame about said blade comprises a lower mechanism having a selectively openable and latchable upper lid hinged thereto, with said blade being selectively sandwiched between said lower mechanism and said lid with said lid being latched to said lower mechanism.

12. The band saw and blade sharpener combination according to claim 9, including means for automatically shutting off said blade advancing means and said sharpening means when all of said teeth of said blade have been sharpened.

13. The band saw and blade sharpener combination according to claim 9, wherein said means for consecutively sharpening each of said teeth of said blade comprises a pivotally mounted sharpening motor arm having a distal end with a sharpening motor affixed thereto, said sharpening motor having a sharpening wheel extending therefrom with said sharpening wheel defining a plane selectively alignable with each of said teeth of said blade, a sharpening motor cam arm affixed to said sharpening motor arm, a combination cam and eccentric with said cam arm communicating with said combination cam and eccentric, and a drive motor driving said combination cam and eccentric, with said sharpening motor arm periodically positioning said sharpening wheel into sharpening engagement with each one of said teeth of said blade.

14. The band saw and blade sharpener combination according to claim 9, wherein said sharpener frame includes a sharpener motor disposed therein with a sharpening wheel thereon, and a single drive motor disposed therein for advancing said blade and for periodically positioning said sharpening wheel into sharpening engagement with each one of said teeth of said blade.

15. The band saw and blade sharpener combination according to claim 14, wherein said sharpener motor and said single drive motor each comprise an electric motor.

16. The band saw and blade sharpener combination according to claim 9 with each of said teeth of said blade defining a tooth pitch, a gullet depth, and a hook angle, wherein said means for consecutively sharpening each of said teeth of said blade includes means for adjusting for said tooth pitch, gullet depth, and hook angle of said teeth of said blade.

* * * * *